Figure 1:
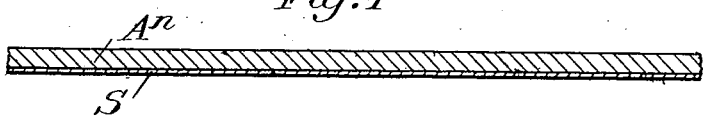

F. W. LOVEJOY.
PHOTOGRAPHIC FILM.
APPLICATION FILED JAN. 19, 1914.

1,232,702.

Patented July 10, 1917.

Inventor
Frank W. Lovejoy

Witnesses
Walter B. Payne

By Church & Rich
his Attorneys

UNITED STATES PATENT OFFICE.

FRANK W. LOVEJOY, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC FILM.

1,232,702.          Specification of Letters Patent.      Patented July 10, 1917.

Application filed January 19, 1914. Serial No. 812,909.

*To all whom it may concern:*

Be it known that I, FRANK W. LOVEJOY, of Rochester, in the county of Monroe and State of New York, have invented certain new and useful Improvements in Photographic Films; and I do hereby declare the following to be a full, clear, and exact description of the same, reference being had to the accompanying drawings, forming a part of this specification, and to the reference-numerals marked thereon.

My present invention relates to photography and more particularly to photographic film and it has for its object to provide a simple, cheap and effective means for preventing the generation of static electricity during the passage of the film over friction surfaces and consequent deleterious effects on the sensitized medium forming or about to form a part thereof. To these and other ends the invention consists, generally, in associating in the structure of the film base a substance that electrifies positively with another substance that electrifies negatively to the end that they may counteract or neutralize each other's tendencies in this direction and the invention consists more specifically in certain improvements and combinations of parts, all as will be hereinafter more fully described, the novel features being pointed out in the claims at the end of the specification.

Figure 2:
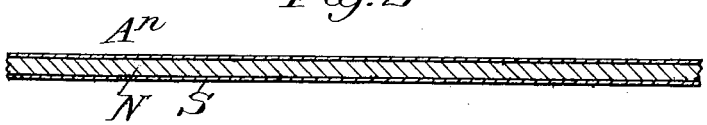
Figure 3:
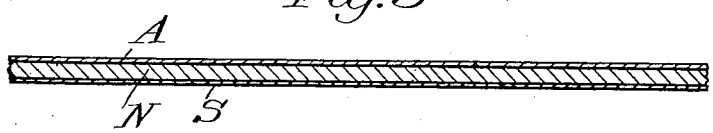
Figure 4:
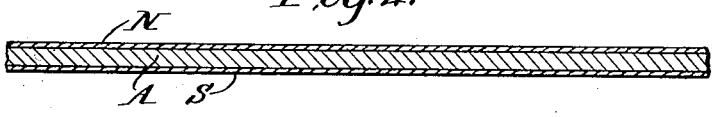

In the drawings:

Figure 1 is a sectional view of a film strip constructed in accordance with and illustrating one embodiment of my invention, and Figs. 2, 3 and 4 are similar views of modified film structures embodying the invention.

Similar reference numerals throughout the several figures indicate the same parts.

One of the difficulties encountered both in the manufacture and in the subsequent manipulation of flexible photographic film and particularly the continuous strip film used in motion picture apparatus is the generation of static electricity due to the more or less rapid passage of the film strip over its various supports with which it is allowed frictional contact. This contact occurs in the course of manufacture when the film support or base (as distinguished from the completed article) is reeled or unreeled or otherwise rapidly moved during and immediately after the application of the sensitized coating thereto and it later occurs again when the film strip is run through the exposing apparatus. In either case, such rubbing as it necessarily undergoes is apt to and usually does generate sufficient static electricity to cause discharges to emanate from the strip which though minute, are sufficient to damage the highly sensitive emulsion or coating and my tests have demonstrated that static marks develop on the film badly sometimes when no spark discharge is visible to the eye. They show their effect thereon by the appearance of streaks or irregular lines of localized exposure where the emulsion has been light struck as becomes evident after development.

I have discovered, however, that cellulose acetate and cellulose nitrate, both of which are physically suitable as bases for photographic film strips, are not similarly affected by the generating influences but on the contrary, that the acetate electrifies positively while the nitrate electrifies negatively. Furthermore, the charge developed in the latter appears to be about three or four times as strong as that developed in the former. On these findings, I have evolved a film in which these substances are so associated that one counteracts or neutralizes, electrically, the tendencies of the other. This association may take the form of an intimate mixture of the two substances or a mere superposition of different layers of each.

Referring more particularly to the drawings, the reference numerals are used as follows throughout: A indicates a body, layer or coating of cellulose acetate; N indicates a body, layer or coating of cellulose nitrate; $A^n$ indicates a body, layer or coating composed of a mixture of cellulose acetate and cellulose nitrate, and S indicates the sensitized surface or emulsion coating.

In Fig. 1 is shown a film strip having a body of the mixed cellulose acetate and cellulose nitrate, directly coated with the emulsion.

Fig. 2 shows the body composed of the nitrate with a coating or layer of the mixture superposed thereon. The emulsion is applied to the opposite side of the nitrate and thus the neutralized element becomes interposed between the nitrate and any contacting surface protecting it therefrom.

Fig. 3 shows the whole body constituted by superposed layers of nitrate and acetate, the emulsion being again applied to the nitrate side. It may be here remarked that where the separate layers of acetate and nitrate are employed, I have found it unnecessary to preserve the ratio of three or four to one in the respective bulks or thicknesses of the two, it being sufficient to attain good results that the outer or contacting layer be relatively thin.

Of course, other possible combinations of the substances on the same principle, such as a reversal of the showing of Fig. 3, that is, a cellulose acetate body A, as shown in Fig. 4 with a coating or backing N of cellulose nitrate will naturally come to mind, but, for the present at least, I find the ones specifically noted and illustrated the most practical for various reasons, it being understood in this connection that the nitrate is, at least at the present time, much cheaper to produce than the acetate. On the whole, I prefer the embodiment of Fig. 2 involving cellulose nitrate as the principal ingredient with a relatively thin coating of the mixture applied to the back thereof, the idea being, in a refinement of the invention and as a most efficient application of the principle involved, to interpose a neutralizing mixture between a film support, susceptible to the generation of static charges, and the surfaces with which it would otherwise directly frictionally contact.

It is not believed that any particular instructions are required to be given herein as to the precise method of manufacture as those at all familiar with the making and coating of photographic film and the handling of the cellulose compounds are equipped to carry out the processes and produce the film of this invention. I might add, however, that I have used acetone as a solvent for the cellulose acetate and cellulose nitrate in preparing the mixtures of the two.

I claim as my invention:

1. A photographic film consisting of a base in which are associated in separate layers two substances respectively adapted to develop positive and negative static charges when acted upon frictionally and a photographically sensitive medium carried thereby.

2. A photographic film composed of a body of cellulose nitrate having superposed thereon a backing having cellulose acetate in its composition in combination with a photographically sensitive medium carried on the other side of the body.

3. A photographic film comprising a film support having a backing composed of a layer or coating of a mixture of cellulose nitrate and cellulose acetate in combination with a photographically sensitive medium carried by the support.

4. A photographic film consisting of a body or support of cellulose nitrate having superposed thereon a backing composed of a mixture of cellulose acetate and cellulose nitrate in combination with a photographically sensitive medium carried on the other side of the body.

FRANK W. LOVEJOY.

Witnesses:
M. B. LAIDLAW,
M. R. McBRIDE.